United States Patent
Dutta

(10) Patent No.: US 8,214,510 B2
(45) Date of Patent: *Jul. 3, 2012

(54) MAINTAINING STATE INFORMATION ON A CLIENT

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 668 days.

This patent is subject to a terminal disclaimer.

(21) Appl. No.: 12/270,943

(22) Filed: Nov. 14, 2008

(65) Prior Publication Data

US 2009/0070418 A1    Mar. 12, 2009

Related U.S. Application Data

(63) Continuation of application No. 09/740,527, filed on Dec. 18, 2000, now Pat. No. 7,454,506.

(51) Int. Cl.
*G06F 15/16* (2006.01)
(52) U.S. Cl. .......................... 709/228; 709/219; 709/225
(58) Field of Classification Search .......................... None
See application file for complete search history.

(56) References Cited

U.S. PATENT DOCUMENTS

| | | | |
|---|---|---|---|
| 5,734,831 A | 3/1998 | Sanders | |
| 5,796,952 A | 8/1998 | Davis et al. | |
| 5,875,296 A | 2/1999 | Shi et al. | |
| 6,085,224 A | 7/2000 | Wagner | |
| 6,134,592 A * | 10/2000 | Montulli | 709/229 |
| 6,421,729 B1 * | 7/2002 | Paltenghe et al. | 709/229 |
| 6,601,169 B2 * | 7/2003 | Wallace et al. | 713/168 |
| 6,675,214 B2 * | 1/2004 | Stewart et al. | 709/226 |
| 6,848,000 B1 * | 1/2005 | Reynolds | 709/226 |
| 6,888,942 B2 * | 5/2005 | Crockett | 380/200 |
| 6,985,953 B1 * | 1/2006 | Sandhu et al. | 709/225 |
| 2002/0004784 A1 * | 1/2002 | Forbes et al. | 705/51 |
| 2006/0101114 A1 * | 5/2006 | Sandhu et al. | 709/203 |

FOREIGN PATENT DOCUMENTS

| | | |
|---|---|---|
| JP | 11-098134 | 4/1999 |
| NL | 1007719 | 12/1997 |

OTHER PUBLICATIONS

Grainger; "Where Have You Been to Yesterday;" ICPUG Electronic Journal, Article 6, vol. 1, No. 3, May 1999, 6 pages.
"The Riddler: Microsoft's Really Hidden Files," [http://www.elizebethmustdie.com/h4x0txt/IE5Hiddenfiles.htm]; Jun. 2000.

* cited by examiner

*Primary Examiner* — Patrice Winder
(74) *Attorney, Agent, or Firm* — John D. Flynn; Gregory K. Goshorn; Greg Goshorn P.C.

(57) ABSTRACT

The present invention provides a system and method of maintaining state information on a client. In response to a client request for a file located on a server, the file is transmitted from the server to the client. An unmodifiable cookie that specifies state information from the server is also transmitted to the client. The client then stores the unmodifiable cookie. A user is unable to alter the unmodifiable cookie on the client machine.

10 Claims, 5 Drawing Sheets

MAINTAINING STATE INFORMATION ON A CLIENT

CROSS-REFERENCES TO RELATED APPLICATIONS

The present application is a continuation and claims the benefit of the filing date of U.S. Pat. No. 7,454,506 entitled, "Method for Maintaining State Information on a Client," filed Dec. 18, 2000, assigned to the assignee of the present application, and herein incorporated by reference.

BACKGROUND

1. Technical Field

The present invention relates to a system for maintaining state information on a client. More particularly, the present invention relates to transmitting from a server an unmodifiable cookie for storage on a client machine in response to a predefined request to the server.

2. Description of the Related Art

The World Wide Web of the Internet is the most successful distributed application in the history of computing. The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "HyperText Transfer Protocol" (HTTP). A browser opens a connection to a server and initiates a request for a document. The server delivers the requested document, typically in the form of a text document coded in a standard Hypertext Markup Language (HTML) format, and generally when the connection is closed in the above interaction, the server serves a passive role, i.e., it accepts commands from the client and cannot request the client to perform any action.

In the Internet paradigm, a network path to a server is identified by a so-called Uniform Resource Locator (URL) having a special syntax for defining a network connection. Use of ah HTML-compatible browser (e.g., Netscape Navigator) at a client machine involves specification of a link via the URL. In response, the client makes a request to the server identified in the link and receives in return a document formatted according to HTML.

Information in web pages accessed over the Internet commonly is downloaded into the client computer system. In addition to downloading the web page, the web server also may transmit a "cookie" to the browser and receive previously transmitted cookies stored in the permanent memory of the browser.

With reference to Internet transactions, a cookie is a packet of information sent by an HTTP server to a World Wide Web browser and then sent back by the browser each time the browser accesses that server. Cookies can contain any arbitrary information the server chooses, subject to the standards acceptable to a browser, and are used to maintain state between otherwise stateless HTTP transactions. Typically cookies are used to authenticate or identify a registered user of a web site without requiring them to sign in each time they access that site. Other uses for cookies include, e.g. maintaining a "shopping basket" of goods a user selects to purchase during a session at a site, site personalization and, tracking a particular user's access to a site.

FIG. 1 is a flow diagram of a process 100 illustrating how a typical browser operates. The user either selects a hyperlink in a Web browser or specifies a link in a browser, step 102. The client system examines its cookie list for matching cookies that need to be sent to the particular Web server, step 104. Specifically, before the client sends an HTTP request to a Web server, the client compares the URL of the requested Web document against all of the stored cookies. If any of the cookies in the cookie list matches the requested URL then information containing the name/value pairs of the matching cookies is sent along with the HTTP request, step 106. If there are no cookies that match the requested URL then the browser sends the request to the server, step 108. The browser receives the response from the server, step 110. The browser then looks for a cookie in the response from the server, step 112. Any cookies present in the response are stored on the hard drive of client machine, step 114 and the requested page is displayed, step 116. In the event a cookie is not present in the response from the server, the requested page is still displayed, step 116. This process is repeated with each hyperlink selected by the user, step 118. When no hyperlink is selected, the process stops, step 120.

Web merchants commonly use cookies to track subscriptions they provide for Web content such as newsletters, magazines, etc. To entice potential permanent subscribers, the Web merchant often provides a free trial subscription to a user. The trial subscription is tracked using a cookie and once the free period expires, the merchant notifies the user in hopes that the user will purchase a subscription. This marketing model is not without its problems for example, the user has the ability to change his identity and register a subsequent time for the same free subscription. This can be done by removing and/or modifying the cookie resident on his computer. The merchant then loses a potential subscriber. Therefore, an unmodifiable cookie that resides on the client machine would help to alleviate this problem.

SUMMARY OF THE CLAIMED SUBJECT MATTER

The present invention provides a system for maintaining state information on a client. A client requests a file located on a server. In response to the request, the file is transmitted from the http server to the http client. An unmodifiable cookie which specifies state information from the http server is also transmitted to the http client. The client then stores the unmodifiable cookie.

In carrying out the above-described method, a computer readable medium on a client containing executable program instructions is utilized. The program requests a file on a http server; receives the file from the http server; receives an unmodifiable cookie which specifies state information from the http server; and causes the unmodifiable cookie to be stored on the http client.

In addition, a computer readable medium on a server is provided. The computer readable medium contains executable program instructions for receiving a request for a file on the http server from a client, transmitting the file from the http server to the http client, and transmitting an unmodifiable cookie that specifies state information from the http server to the http client.

In addition, a computer system is provided in accordance with the present invention. The computer system comprises a processor; a memory coupled to the processor; a computer readable medium coupled to the processor that contains; instructions to carry out the methods described above for the server and the client.

BRIEF DESCRIPTION OF THE FIGURES

The foregoing and other features and advantages, of the present invention will become more apparent from the detailed description of the best mode for carrying out the invention as rendered below. In the description to follow reference will be made to the accompanying drawings, where like reference numerals are used to identify like parts in the various views in which.

DETAILED DESCRIPTION OF THE FIGURES

Figure 1:
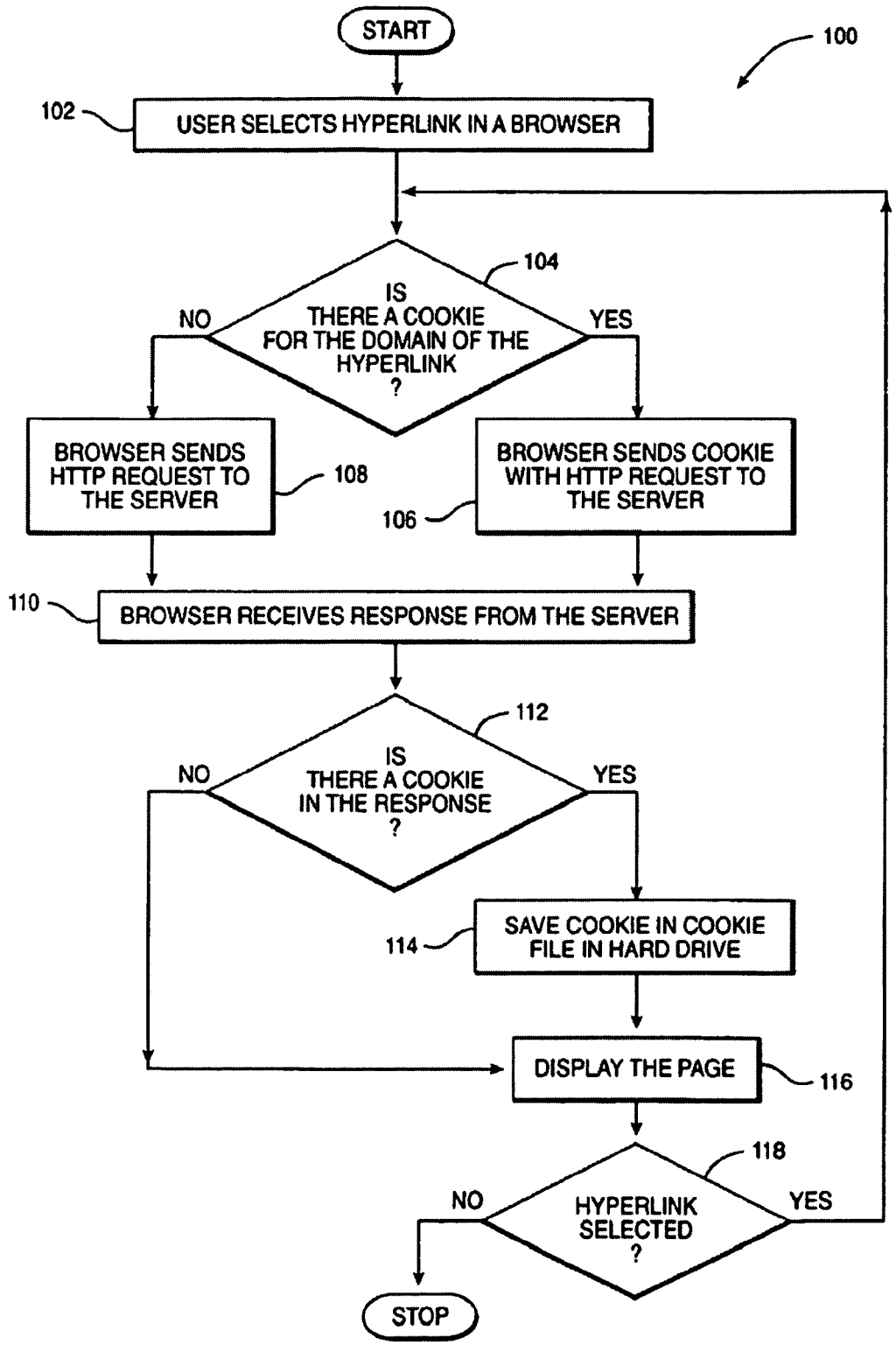
FIG. 1 is a flow diagram of a process illustrating how a typical browser operates.

The present invention is directed to a method of and a system for a server to ensure identification of a web client by installing a user unmodifiable cookie file in the web, client's browser program.

In the examples discussed below, the server uses a hypertext transfer protocol ("HTTP") to communicate over a network with clients. The clients also communicate with the server using the HTTP. It should be noted that cookies in accordance with the present invention may be transferred via other communication protocols in addition to HTTP. Examples of other communication protocols include but are not limited to, file transfer protocol, gopher, and wireless application protocol. The present invention is applicable to any type of communication protocol where information packets are transferred between server and client.

The server typically includes a server processor, a memory and a computer readable medium, such as a magnetic ("hard disk") or optical mass storage device. The computer readable medium of the server contains computer program instructions for transmitting the file from the server system to the client system and for transmitting the cookie to the client system. The client typically includes a client processor, a memory and a computer readable medium, such as a magnetic or optical mass storage device. The computer readable medium of the client contains computer program instructions for receiving the cookie, which specifies the state information, from the server and for storing the cookie at the client.

An example of how a cookie is generated and transferred will now be discussed. It will be appreciated that alternative formats may be used in accordance with the principles of the present invention. As stated above, the extension to the HTTP protocol adds a piece of state information to the HTTP header as part of a response from a Web server. Typically, the state information is generated by a common gateway interface ("CGI") script. The state information is stored by the receiving client system in the form of a "cookie file" for later use. An example of the syntax of the new data, is:

Set-Cookie: NAME=VALUE; expires=DATE;
path=PATH;
domain=DOMAIN_NAME; secure

The capitalized terms can be set by the server system. The first attribute is "NAME=VALUE". This attribute serves to identify a cookie. The "NAME" attribute is a name for the cookie. The "VALUE" is a value assigned to the previously defined name. The "VALUE" can be a string of characters.

The "expires" attribute specifies a data string that defines the valid life time of the corresponding cookie. Once the expiration date has been reached, the cookie will no longer be stored in the client system. Thus, die client system will no longer respond to Web servers with the cookie. Many coding schemes for designating time can be used. If an expires attribute is not provided by the server, then the cookie expires when the user's session ends. This can be implemented by storing the cookie only in volatile memory.

The "domain=DOMAIN_NAME" attribute defines a domain for which the cookie is valid. The domain attribute is usually set using the domain name of the sending Web server. Client systems examine the domain attribute when making later http requests. If the server that the client system is accessing falls within the defined DOMAIN_NAME, then the cookie may be sent to the server when making the HTTP request. A domain name that defines a subset of a domain is deemed to match a larger enclosing domain. For example, the host names "anvil.acme.com" and "shipping.crate.acme.com" fall within the "acme.com" domain.

The "path" attribute is used to specify a subset of file system directories in a domain for which the cookie is valid. If a cookie has already passed "domain" matching, then the path name of the URL for a requested document is compared with the "path" attribute. If there is a match, the cookie is considered valid and is sent along with the HTTP request. All the characters of the defined path must match. However there may be additional characters on the path name. Thus, further defined subdirectories will match a path to the parent directory. If no path is specified when a cookie is created, then the default path will be the same path as the document that was sent with the header which contains the cookie.

The last element of the cookie definition is the optional label of "secure." If a cookie is marked "secure," then the cookie will only be retransmitted if there is a secure communication channel to the server system. In a preferred embodiment of the present invention, this means that the cookie will only be sent to HTTPS servers. (HTTP over Secure Socket Layer) If the "secure" attribute is hot specified, a cookie is considered safe to be sent over unsecured channels.

When a client system selects a hyperlink for a particular Web server, the client system first examines the cookie files on the client hard drive for matching cookies to be sent to the particular Web server. As noted above with reference to FIG. 1, before the client sends an HTTP request to a Web server, the client compares the URL of the requested Web document against all of the stored cookies. If any of the cookies stored on the hard drive match the requested URL then information containing the name/value pairs of the matching cookies will be sent along with the HTTP request. In accordance with the present invention the server sends unmodifiable cookies with the response mat are stored on the client machine.

Unmodifiable cookies may be created by altering an existing cookie such that it is unmodifiable by a user. One example may include encrypting the cookie file where the encryption code is known only to the browser program. For security reasons, the encryption code would not be revealed to the user. In a preferred embodiment an unmodifiable cookie is encrypted using a symmetric encryption key. An example of suitable symmetric encryption key includes but is not necessarily limited to a Data Encryption Standard (DES) key with a 56 bit key length. The key length of symmetric encryption keys often plays a major role in preventing brute force attack on the key.

Data integrity of the unmodifiable cookie file may be ensured by applying a complex hash function to the file and storing the hash value in an encrypted form. If an unmodifiable cookie file is edited by a user (even though the user has not broken the encryption code) when the browser compares the hash functions the hash value of the modified file will not match the hash value of the encrypted file. There are many other techniques involving public key and hashing that may be used to provide security and integrity to the cookie file data. Examples of these techniques include but are not limited to an RSA algorithm, a Digital Signature Algorithm, and a Secure Hash Algorithm.

As with the current systems, the browser may provide the user with a choice to accept or reject "unmodifiable" cookies on their hard drive in addition to being able to accept or reject modifiable cookies. Thus the client is able to maintain control over which cookies are accepted and which are not. Alternatively, when the client desires the removal of an unmodifiable cookie, the server that issued the cookie is capable of removing or disabling the cookie on the client's hard drive.

Figure 1A:
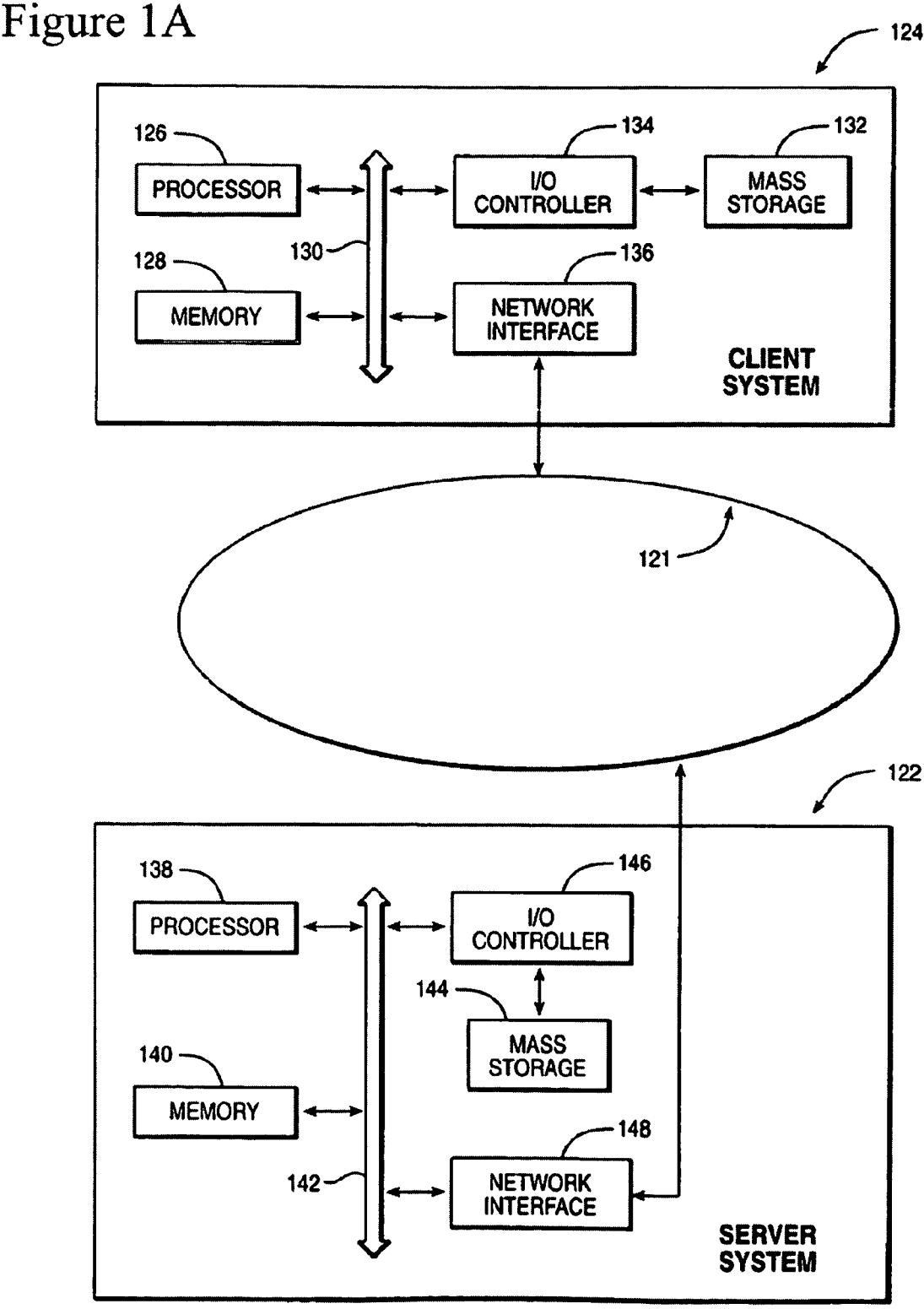
FIG. 1A is a block diagram of an example of a client-server system connected through the Internet in accordance with the present invention.

FIG. 1A shows, in more detail; an example of a client-server system connected through the Internet 121. In this example, a remote server system 122 is connected through the Internet 121 to client system 124. The client system 124 includes conventional components such as a processor 126, memory 128 (e.g. RAM), a bus 130 which couples the processor 126 and memory 128, a mass storage device 132 (e.g. a magnetic hard disk or an optical storage disk) coupled to the processor and memory through an I/O controller 134 and a network interface 136, such as a conventional modem. The server system 122 also includes conventional components such as a processor 138, memory 140 (e.g. RAM), a bus 142 which couples the processor 138 and memory 140, a mass storage device 144 (e.g. a magnetic or optical disk) coupled to the processor 138 and memory 140 through an I/O controller 146 and a network interlace 148, such as a conventional modem. It will be appreciated from the description below that the present invention may be implemented in software which is stored as executable instructions on a computer readable medium on the client and server systems, such as mass storage devices 132 and 144 respectively, or in memories 128 and 140 respectively.

Figure 2:
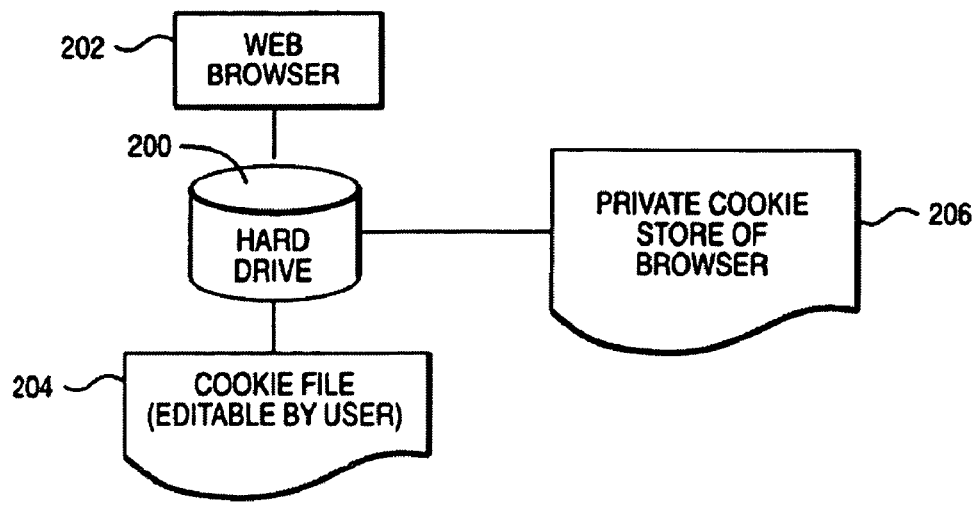
FIG. 2 is a schematic illustration of an exemplary client system in accordance with the present invention.

FIG. 2 is a schematic illustration of a client system according to the present invention. The CPU or hard drive 200 communicates over a network through a browser 202. The cookies transmitted from various servers visited by the user are stored in a public cookie file 204 and if they are labeled "unmodifiable" then a copy is stored in a separate "private" cookie file 206. As discussed above, the private cookie file contains unmodifiable cookie information.

Figure 3:
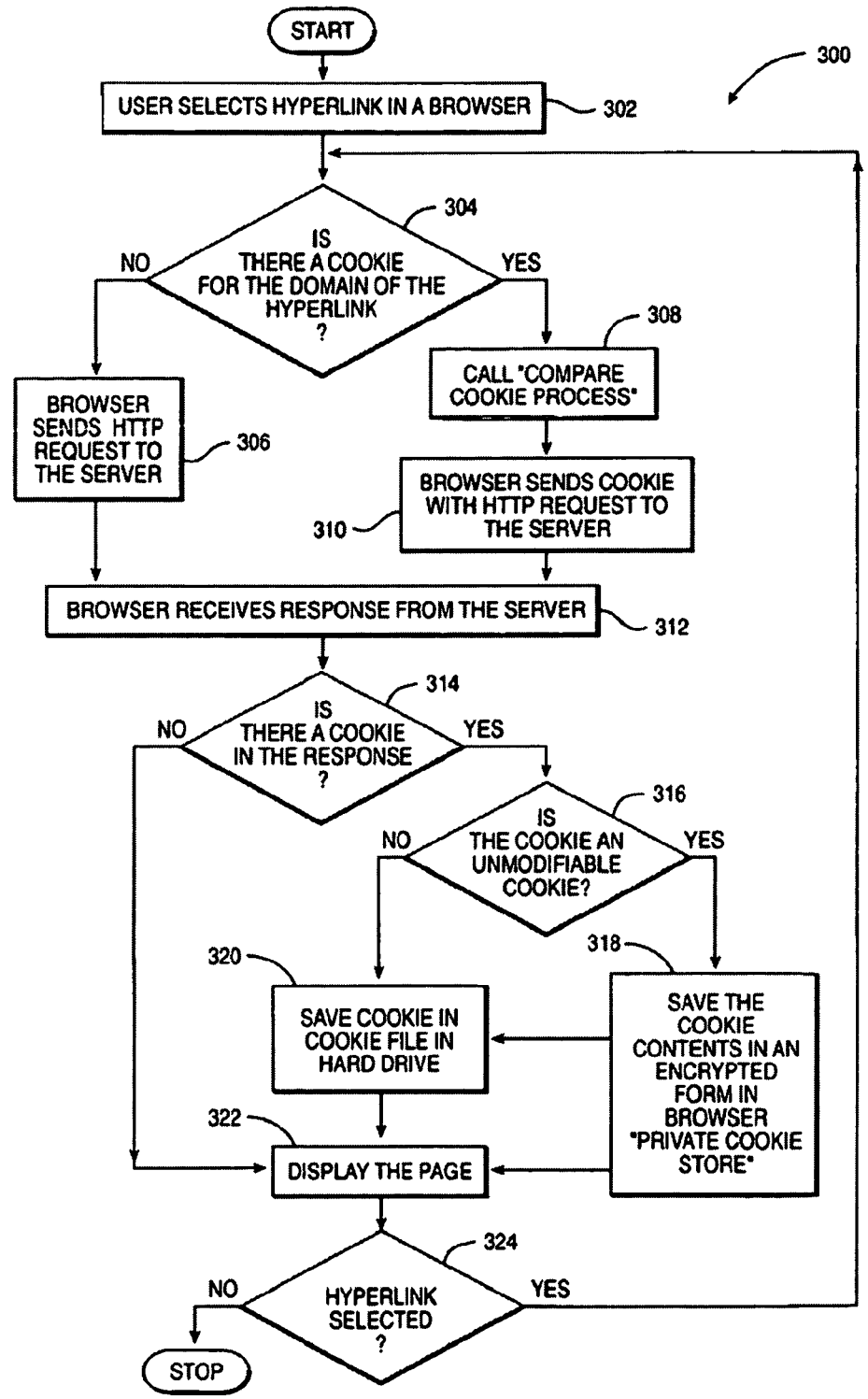
FIG. 3 is a flow diagram of a process in accordance with a preferred embodiment of the present invention.

FIG. 3 is a flow diagram of process 300 in accordance with a preferred embodiment of the present invention. A user selects a hyperlink using a browser, step 302. The browser checks the cookie files resident on the hard drive for a cookie that matches the requested domain of the hyperlink, step 304. If a matching cookie is not present, then the browser sends the HTTP request on to the server, step 306. If a matching cookie is present on the client machine, then the browser will compare the cookie in the public cookie file with the cookies in the protected cookie file, step 308, which is discussed in more detail below with reference to FIG. 4. The browser then sends the matching cookie with the HTTP request to the server, step 310. Regardless of whether the browser sent a cookie with the HTTP request, steps 306 and 310, the browser will receive a response from the server, step 312. The browser examines the response sent in step 312 for a cookie, step 314. If a cookie is present in the response from the server, then the browser checks to see if the cookie is unmodifiable, step 316. If an unmodifiable cookie is present, it is saved in a private cookie file, step 318 and a copy of the unmodifiable cookie is saved in the public cookie, file, step 320. If the cookie is not unmodifiable, then the cookie is saved in the public cookie file on the hard drive, step 320. Once the cookie is stored on the hard drive, the requested page is displayed, step 322. Likewise, if in step 314 there is no matching cookie found in the response from the server, then the requested page is simply displayed, step 322. If the user selects an additional hyperlink step 324, the process repeats itself starting at step 304. If no hyperlink is selected, the process ends. It should be noted that the present invention is easily adapted for use with existing browser software programs. In the alternative, newly developed browser programs may not need to copy the unmodifiable cookie to both a public and private cookie file.

Figure 4:
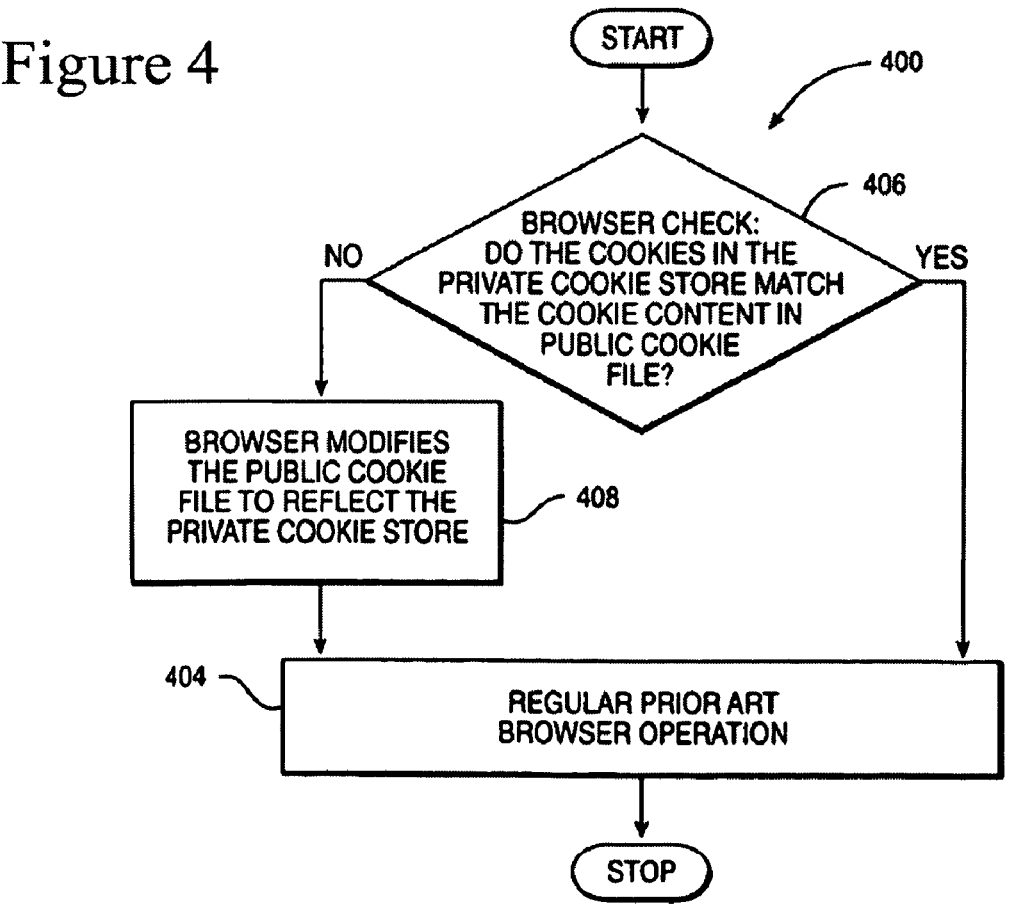
FIG. 4 is a flow diagram of an exemplary cookie comparison process carried out by the browser.

FIG. 4 is a flow diagram of an exemplary cookie comparison process 400 carried out by the browser. In response to the request for a specific hyperlink, the browser as in step 304 discussed above with reference to FIG. 3, has searched and found a cookie that matches the domain of the hyperlink. The browser then checks the cookies in the private cookie file to see if they match those in the public cookie file, step 406. If they match, then the browser proceeds with normal operation as described above with reference to FIG. 3, step 404. If they do not match, then the browser, updates the public cookie file with an appropriate copy of any missing unmodifiable cookie files found in the private cookie file, step 408.

Figure 5:
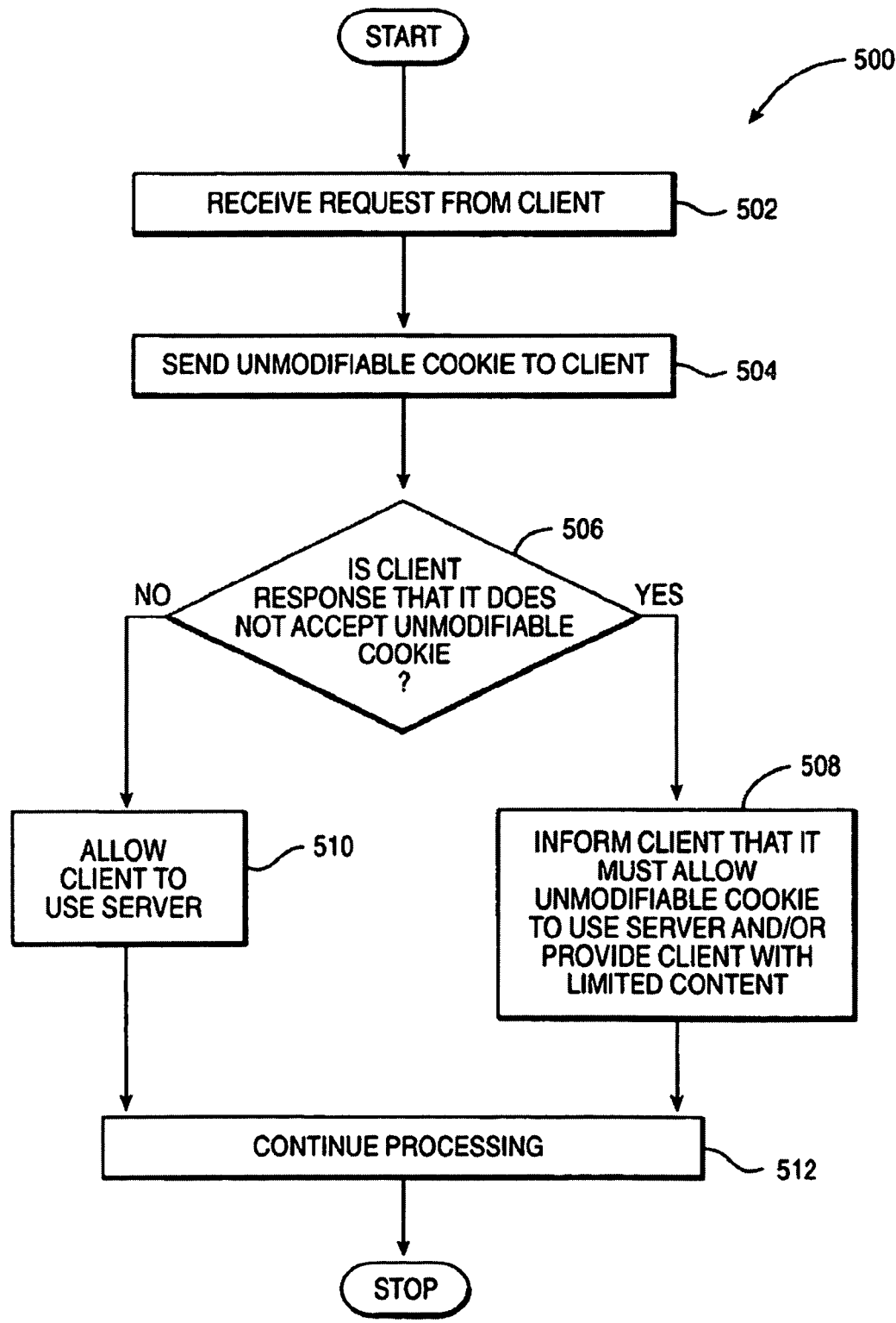
FIG. 5 is a flow diagram of a server process in accordance with the present invention.

FIG. 5 is a flow diagram of a server process 500 in accordance with the present invention. The server receives a request from the client, step 502. The server sends a response to the client with an unmodifiable cookie, step 504. The server checks the client response for acceptance or rejection of the unmodifiable cookies, step 506. If the unmodifiable cookie is rejected, then the server sends a message to the client stating that it will not allow access to the requested material unless the client accepts unmodifiable cookies, step 508. If the client machine is configured to accept unmodifiable cookies, then the server allows the client to view the requested page, step 510.

While the invention has been shown and described with reference to particular embodiments thereof, it will be understood by those skilled in the art that the foregoing and other changes in form and detail may be made therein without departing from the spirit and scope of the invention.

I claim:

1. A system for maintaining state information on a client, comprising:
   a processor;
   a memory coupled to the processor;
   a computer readable medium coupled to the processor, the computer readable medium containing executable program instructions for:
   transmitting an unmodifiable cookie, which specifies state information from a server to the client; and
   storing the cookie on the client, wherein a copy of the cookie is stored in a public cookie file and the cookie is stored in a private cookie file in a location separate from the public cookie file on the client; and
   updating the cookie in the public cookie file to reflect the cookie in the private cookie file.

2. The system of claim 1 wherein the cookie is transmitted from the client to the server when the client makes predefined requests to the server and wherein the cookie is transmitted with the file.

3. The system of claim 1, the computer readable medium containing executable program instructions further comprising instructions for, in response to a request from the client for a document requiring a cookie, checking the public cookie file for a matching cookie.

4. The system of claim 3, the computer readable medium containing executable program instructions further comprising instructions for, where no matching cookie is present in the public cookie file, checking the private cookie file for a matching cookie.

5. A computer readable medium on a client containing executable program instructions for performing a method comprising:
 transmitting an unmodifiable cookie which specifies state information from a server to the client; and
 storing the cookie on a non-transitory computer readable medium on the client, wherein a copy of the cookie is stored in a public cookie file and the cookie is stored in a private cookie file in a location separate from the public cookie file on the client; and
 updating the cookie in the public cookie file to reflect the cookie in the private cookie file.

6. The computer readable medium of claim 5 wherein the cookie is transmitted from the client to the server when the client makes predefined requests to the server and wherein the cookie is transmitted with the file.

7. The computer readable medium of claim 6 further comprising in response to a request from the client for a document requiring a cookie, instructions for checking the public cookie file for a matching cookie.

8. The computer readable medium of claim 7 where no matching cookie is present in the public cookie file, further comprising instructions for checking the private cookie file for a matching cookie.

9. A computer system, the computer system comprising:
 a processor;
 a memory coupled to the processor;
 a computer readable medium coupled to the processor, the computer readable medium containing executable program instructions for:
  transmitting an unmodifiable cookie that specifies state information from a server to the client; and
  storing the cookie on the client, wherein a copy of the cookie is stored in a public cookie file and the cookie is stored in a private cookie file in a location separate from the public cookie file on the client; and
  updating the cookie in the public cookie file to reflect the cookie in the private cookie file.

10. The computer system of claim 9 wherein the cookie is transmitted from the client to a server when the client makes predefined requests to the server.

* * * * *